United States Patent
Huang et al.

(10) Patent No.: US 12,547,337 B2
(45) Date of Patent: *Feb. 10, 2026

(54) MEMORY SUB-SYSTEM FOR MONITORING MIXED MODE BLOCKS

(71) Applicant: Micron Technology, Inc., Boise, ID (US)

(72) Inventors: Jianmin Huang, San Carlos, CA (US); Xiangang Luo, Fremont, CA (US); Chun Sum Yeung, San Jose, CA (US); Kulachet Tanpairoj, San Mateo, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/812,356

(22) Filed: Aug. 22, 2024

(65) Prior Publication Data

US 2024/0411475 A1 Dec. 12, 2024

Related U.S. Application Data

(63) Continuation of application No. 17/378,970, filed on Jul. 19, 2021, now Pat. No. 12,073,107.

(51) Int. Cl.
*G06F 3/06* (2006.01)

(52) U.S. Cl.
CPC .......... *G06F 3/0652* (2013.01); *G06F 3/0616* (2013.01); *G06F 3/0653* (2013.01); *G06F 3/0688* (2013.01)

(58) Field of Classification Search
None
See application file for complete search history.

(56) References Cited

U.S. PATENT DOCUMENTS

| | | |
|---|---|---|
| 2013/0173844 A1 | 7/2013 | Chen et al. |
| 2014/0231954 A1 | 8/2014 | Lue |
| 2015/0026387 A1* | 1/2015 | Sheredy ............ G11C 16/3495 711/103 |
| 2016/0179386 A1 | 6/2016 | Zhang |
| 2016/0335178 A1 | 11/2016 | Patel |
| 2018/0211708 A1 | 7/2018 | Igahara et al. |

(Continued)

FOREIGN PATENT DOCUMENTS

WO 2017074570 A1 5/2017

OTHER PUBLICATIONS

Alsalibi AI, Mittal S, Al-Betar MA, Sumari PB. A survey of techniques for architecting SLC/MLC/TLC hybrid Flash memory-based SSDs. Concurrency Computat Pract Exper. 2018; 30:e4420. https://doi.org/10.1002/cpe.4420 (Year: 2018).*

(Continued)

*Primary Examiner* — Stephanie Wu
(74) *Attorney, Agent, or Firm* — Brooks, Cameron & Huebsch, PLLC (57) ABSTRACT

An apparatus can include a block program erase count (PEC) component. The block PEC component can monitor a quantity of program erase counts (PECs) for each particular type of block of a non-volatile memory array. The block PEC component can further determine which block of the superblock to write host data to next based on the quantity of PECs. The block PEC component can further write host data to the determined block.

20 Claims, 6 Drawing Sheets

(56) References Cited

U.S. PATENT DOCUMENTS

| | | |
|---|---|---|
| 2019/0171372 A1 | 6/2019 | Szubbocsev |
| 2019/0303038 A1 | 10/2019 | Hubbard |
| 2020/0264792 A1* | 8/2020 | Paley .................... G06F 3/0679 |
| 2020/0310646 A1 | 10/2020 | Song |
| 2020/0393972 A1 | 12/2020 | Tomic et al. |
| 2022/0083221 A1 | 3/2022 | Kumar et al. |
| 2022/0164120 A1 | 5/2022 | Kannan et al. |

OTHER PUBLICATIONS

Liu, D., Yao, L., Long, L., Shao, Z., & Guan, Y. (2017a). A workload-aware flash translation layer enhancing performance and lifespan of TLC/SLC Dual-mode flash memory in embedded systems. Microprocessors and Microsystems, 52, 343-354. https://doi.org/10.1016/j.micpro.2016.12.009 (Year: 2017).*

Choudhuri, et al., "Performance Improvement of Block Based NAND Flash Translation Layer", retrieved from https://www.ics.uci.edu/~givargis/pubs/C32.pdf., Sep. 30-Oct. 3, 2007, 6 pages.

\* cited by examiner

MEMORY SUB-SYSTEM FOR MONITORING MIXED MODE BLOCKS

PRIORITY INFORMATION

This application is a continuation of U.S. application Ser. No. 17/378,970, filed Jul. 19, 2021, which issues as U.S. Pat. No. 12,073,107 on Aug. 27, 2024, the contents of which are incorporated herein by reference.

TECHNICAL FIELD

Embodiments of the disclosure relate generally to memory sub-systems, and more specifically, relate to memory sub-system for monitoring mixed mode blocks.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to media management operations for monitoring mixed mode blocks associated with a memory sub-system, in particular to memory sub-systems that include a block program erase count (PEC) component. A memory sub-system can be a storage device, a memory module, or a hybrid of a storage device and memory module. An example of a memory sub-system is a storage system, such as a solid state drive (SSD). Examples of storage devices and memory modules are described below in conjunction with FIG. 1. In general, a host system can utilize a memory sub-system that includes one or more components, such as "memory devices" that store data. The host system can provide data to be stored at the memory sub-system and can request data to be retrieved from the memory sub-system.

A memory device can be a non-volatile memory device. One example of non-volatile memory devices is a negative-and (NAND) memory device (also known as flash technology). Other examples of non-volatile memory devices are described below in conjunction with FIG. 1. A non-volatile memory device is a package of one or more dice. Each die can consist of one or more planes. Planes can be groups into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area than can be erased. Pages cannot be erased individually, and only whole blocks can be erased.

Each of the memory devices can include one or more arrays of memory cells. Depending on the cell type, a cell can be written to in order to store one or more bits of binary information, and has various logic states that correlate to the number of bits being stored. The logic states can be represented by binary values, such as "0" and "1", or combinations of such values. There are various types of cells, such as single level cells (SLCs), multi-level cells (MLCs), triple level cells (TLCs), and quad-level cells (QLCs). For example, a SLC can store one bit of information and has two logic states.

Some NAND memory devices employ a floating-gate architecture in which memory accesses are controlled based on a relative voltage change between the bit line and the word lines. Other examples of NAND memory devices can employ a replacement-gate architecture that can include the use of word line layouts that can allow for charges corresponding to data values to be trapped within memory cells based on properties of the materials used to construct the word lines.

Memory sub-systems can use cache blocks to write host data to for improved performance. In some examples, the cache blocks for host data can be hybrid blocks. These hybrid blocks can be blocks that will be used in a single-level-cell (SLC), tri-level-cell (TLC), or quad-level-cell (QLC) mode. This can mean that although a particular block is currently being used as an SLC block, that it could also subsequently be used as a TLC or QLC block. When a host indicates to write further data, firmware of the memory sub-system can choose a free block (e.g., a block that hasn't been written to already or that doesn't contain data that needs to be maintained or saved). A number of factors can contribute to selecting a next block for writing data. These factors can include, for example, wear leveling rules, block availability, type of blocks, available idle times, program/erase counts (PECs), etc.

Each of the blocks of memory of the memory sub-system can include its own statistical data regarding block usage. For example, one block statistic can include a PEC variable. This PEC variable can monitor how many program/erase (PE) cycles that have been performed on the particular block. The PEC count can be incremented by one (1) for every erase operation performed on the block whether the block is erased in SLC, TLC, or QLC mode. In some previous approaches, a wear ratio can be assumed to be 1:1, meaning that one (1) SLC erase operation is equal to one (1) TLC erase operation, and equal to one (1) QLC erase operation performed on the block. The capability to cycle the block can be based on the lowest cycling capability (e.g., SLC cycles for both TLC and QLC based systems).

In some examples, usage of the memory sub-system can vary in regards to a type of block used. For example, some usage may rely more heavily on SLC cache performance while others may prefer steady performance of TLC cache, etc. Different usage can cause a mixture of SLC, TLC, and/or QLC usage of blocks. Mixed percentage of each type of block can have a large impact on block reliability. As an example, a large percentage of SLC mode blocks used can degrade cell endurance and reliability more quickly than using TLC and/or QLC mode blocks. In order to ensure a threshold level of quality for block use, a memory sub-system can be setup to perform in a worst case scenario approach which assumes 100% SLC usage to avoid the possibility that if anything approaches 100% SLC usage, that the memory sub-system is accommodating such use.

This can put unnecessary stress on the memory sub-system operation and can lower the system capability due to the memory sub-system using a lower cycling capability than it may otherwise be able to do so while still maintaining a minimum level of performance. In these previous approaches where only a PEC cycle count on blocks in general is monitored, and not which type of block the PEC count is performed on, it is not be possible to determine which type of block has how many PEC cycles performed on. Put another way, out of a particular number of PEC cycles performed on a block of memory, the memory sub-system does not know how many cycles were performed on each SLC mode block, each TLC mode block, and each QLC mode block, respectively.

Aspects of the present disclosure address the above and other deficiencies by monitoring which type of mixed mode block (e.g., which type of SLC mode, TLC mode, and QLC mode block) has a particular PEC count. In this approach, every time a particular type of block is written (e.g., programmed) to or erased, the PEC count for that particular type of block is incremented by one (1). For example, when an SLC block is written to or erased the SLC block PEC count is incremented by one (1), when a TLC block is written to or erased the TLC block PEC count is incremented, and so forth. This allows for two different approaches for determining a next block to write host data to. A first approach can include determining a next block with a lowest PEC count for that type of block, as will be described further below in association with FIG. 3. A second approach can include determining a next block with a lowest PEC ratio, as will be described further in association with FIG. 4.

Figure 1:
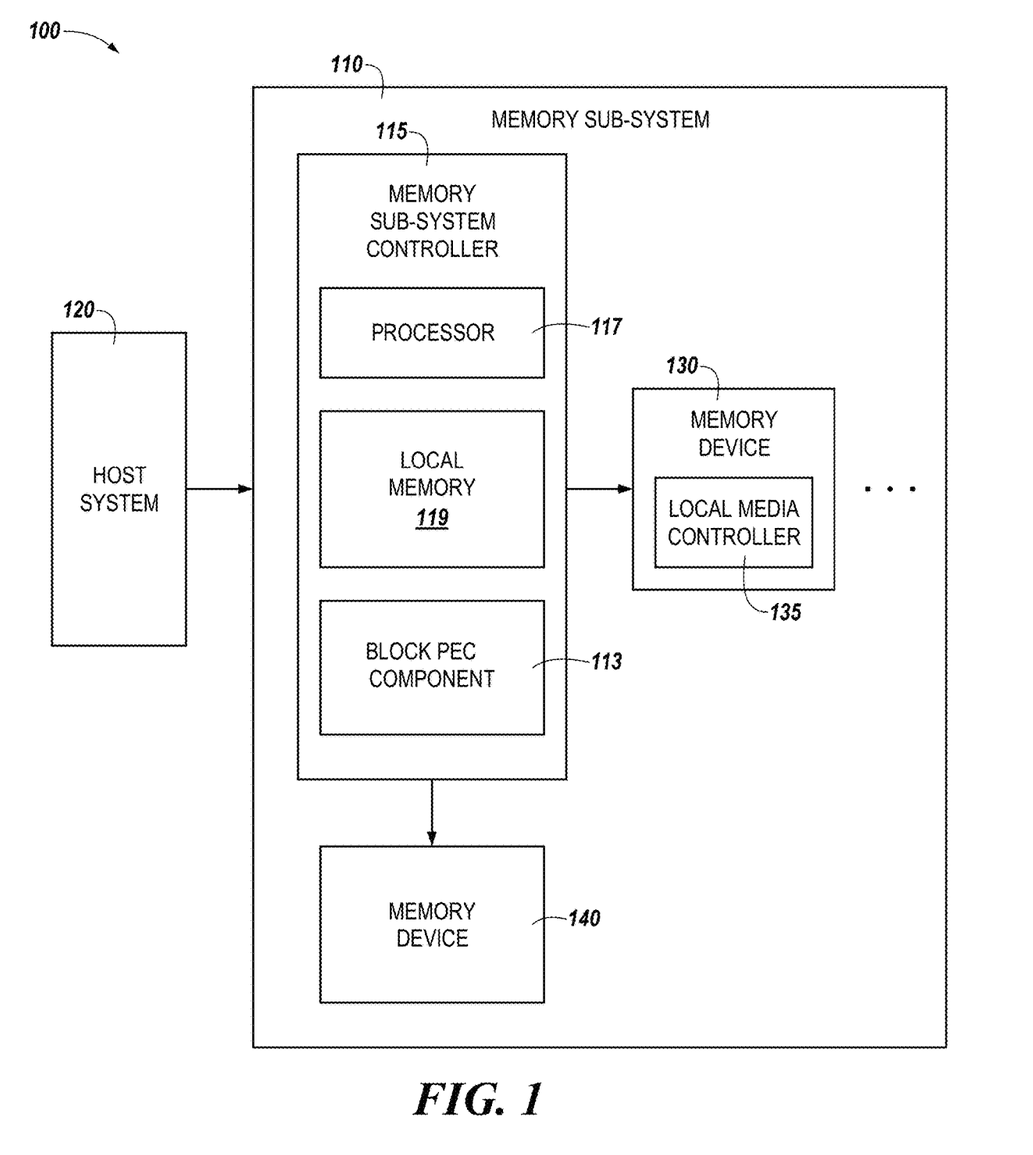
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include various combinations of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) includes negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a block PEC component 113 (or "MM superblock component," for brevity) that can be configured to orchestrate and/or perform operations to monitor mixed mode blocks and determine a next block to write host data to and can use various components, data paths, and/or interfaces of the memory sub-system 110 to do so. The block PEC component 113 can include various circuitry to facilitate selection of superblocks and control of the storage of data in the memory cells of the memory devices 130, 140. For example, the block PEC component 113 can include a special purpose circuitry in the form of an ASIC, FPGA, state machine, and/or other logic circuitry or software and/or firmware that can allow the block PEC component 113 to orchestrate and/or perform data storage operations related to monitoring mixed mode blocks and determining a next block to write data to and communicate to various components, data paths, and/or interfaces of the memory sub-system 110.

The block PEC component 113 can be communicatively coupled to the memory devices 130, 140 and can access the memory device 130, the memory device 140, internal data paths of the memory sub-system 110, and/or interfaces of the memory sub-system 110 to perform the operations described herein and/or to transfer storage data to additional elements of the memory sub-system 110. In some embodiments, the operations performed by the block PEC component 113 can be performed during an initialization or pre-initialization stage of data transfer within the memory sub-system 110 and/or the memory sub-system controller 115.

In some embodiments, the memory sub-system controller 115 includes at least a portion of the block PEC component 113. For example, the memory sub-system controller 115 can include a processor 117 (processing device) configured to execute instructions stored in local memory 119 for performing the operations described herein. In some embodiments, the block PEC component 113 is part of the host system 110 (not illustrated), an application, or an operating system.

The memory devices 130, 140 in FIG. 1 can include a number of physical blocks in accordance with some embodiments of the present disclosure. For example, the memory devices 130, 140 can include a NAND flash memory array including the number of physical blocks. However, embodiments of the present disclosure are not limited to a particular type of memory or memory array. For example, the memory array can be a DRAM array, an RRAM array, or a PCRAM array, among other types of memory arrays. Further, the memory array can be located on a particular semiconductor die along with various peripheral circuitry associated with the operation thereof.

The memory cells of the memory array can be mixed mode cells operable as SLCs and/or XLCs (e.g., extra-level cells which can refer to cells operable at a level greater than SLCs, also referred to as non-SLC mode cells, where tri-level-cells (TLC) and quad-level-cells (QLC) are non-SLC mode cells). The number of physical blocks in the memory array can be 128 blocks, 512 blocks, or 1,024 blocks, but embodiments are not limited to a particular multiple of 128 or to any particular number of physical blocks in memory array. Further, different portions of memory can serve as a dynamic SLC cache for media management operations, such as garbage collection. For example, different portions of memory can be dynamically increased and/or decreased in size as demands on the memory are increased and/or decreased and garbage collection more efficiently address these demands.

Each physical block of the memory array can contain a number of physical rows of memory cells coupled to access lines (e.g., word lines). The number of rows (e.g., word lines) in each physical block can be 32, but embodiments are not limited to a particular number of rows per physical block. Further, the memory cells can be coupled to sense lines (e.g., data lines and/or digit lines).

Each row can include a number of pages of memory cells (e.g., physical pages). A physical page refers to a unit of programming and/or sensing (e.g., a number of memory cells that are programmed and/or sensed together as a functional group). Each row can comprise one physical page of memory cells. However, embodiments of the present disclosure are not so limited. For instance, in a number of embodiments, each row can comprise multiple physical pages of memory cells (e.g., one or more even pages of memory cells coupled to even-numbered bit lines, and one or more odd pages of memory cells coupled to odd numbered bit lines). Additionally, for embodiments including XLCs, a physical page of memory cells can store multiple pages (e.g., logical pages) of data, for example, an upper page of data and a lower page of data, with each cell in a physical page storing one or more bits towards an upper page of data and one or more bits towards a lower page of data.

In a non-limiting example, an apparatus (e.g., the computing system 100) can include a memory sub-system block PEC component 113. The memory sub-system block PEC component 113 can be resident on the memory sub-system 110. As used herein, the term "resident on" refers to something that is physically located on a particular component. For example, the memory sub-system block PEC component 113 being "resident on" the memory sub-system 110 refers to a condition in which the hardware circuitry that comprises the memory sub-system block PEC component 113 is physically located on the memory sub-system 110. The term "resident on" can be used interchangeably with other terms such as "deployed on" or "located on," as referred to herein.

The memory sub-system block PEC component 113 can be configured to monitor mixed mode blocks. The memory sub-system block PEC component 113 can determine which block to write host data to next based on the monitored PEC of each of a number of mixed mode blocks, along with other parameters described below in association with FIGS. 3-4.

Figure 2:
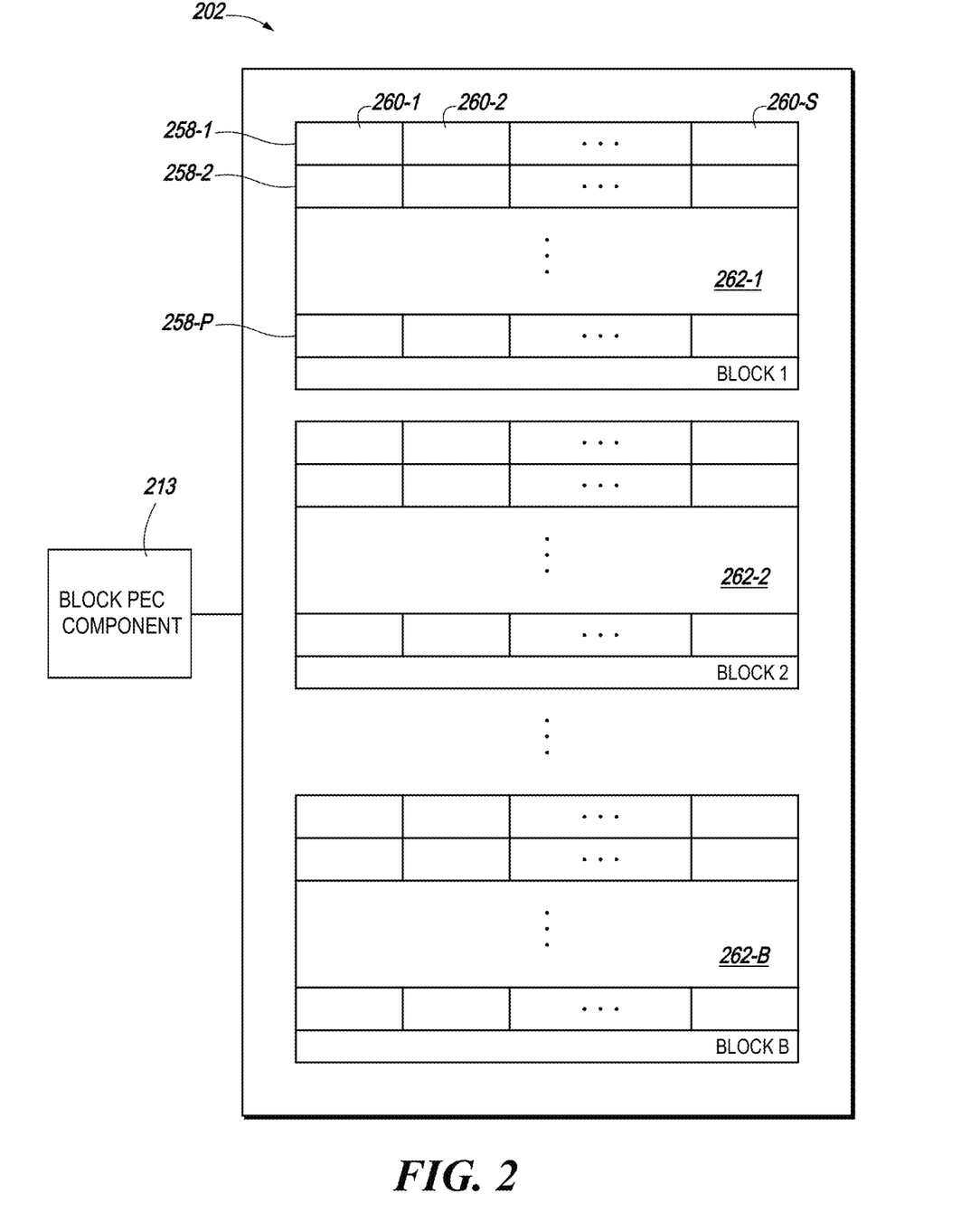
FIG. 2 illustrates an example of a non-volatile memory array for monitoring mixed mode blocks in accordance with some embodiments of the present disclosure.

FIG. 2 illustrates a diagram of a block PEC component 213 and a memory array 202 having physical blocks in accordance with some embodiments of the present disclosure. The block PEC component 213 (which can be similar to block PEC component 113 in FIG. 1) can be coupled to the memory array 202. The memory array 202 can represent a memory array of the non-volatile memory devices 130/140 in FIG. 1, for example. The memory array 202 can be, for example, a NAND flash memory array. As an additional example, memory array 202 can be an SCM array, such as, for instance, a three-dimensional cross-point (3D Cross-point) memory array, a ferroelectric RAM (FRAM) array, or a resistance variable memory array such as a PCRAM, RRAM, or spin torque transfer (STT) array, among others. Further, although not shown in FIG. 2, memory array 202 can be located on a particular semiconductor die along with various peripheral circuitry associated with the operation thereof.

As shown in FIG. 2, the memory array 202 has a number of physical blocks 262-1 (BLOCK 1), 262-2 (BLOCK 2), . . . , 262-B (BLOCK B) of memory cells. The memory cells can be operated with various programming times and trims. A number of physical blocks 262 of memory cells can be included in a plane of memory cells, and a number of planes of memory cells can be included on a die. For instance, in the example shown in FIG. 2, each physical block 262 can be part of a single die. The portion of the memory array 202 illustrated in FIG. 2 can be a die of memory cells and/or a logical unit.

As shown in FIG. 2, each physical block 262 includes a number of physical rows (e.g., rows 258-1, 258-2, . . . , 258-R) of memory cells coupled to access lines (e.g., word lines). Further, although not shown in FIG. 2, the memory cells can be coupled to sense lines (e.g., data lines and/or digit lines). As one of ordinary skill in the art will appreciate, each row 258 can include a number of pages of memory cells (e.g., physical pages). A physical page refers to a unit of programming and/or sensing (e.g., a number of memory cells that are programmed and/or sensed together as a functional group). In the embodiment shown in FIG. 2, each row 258 comprises one physical page of memory cells. However, embodiments of the present disclosure are not so limited. For instance, in an embodiment, each row can comprise multiple physical pages of memory cells (e.g., one or more even pages of memory cells coupled to even-numbered bit lines, and one or more odd pages of memory cells coupled to odd numbered bit lines). Additionally, for embodiments including multilevel cells, a physical page of memory cells can store multiple logical pages of data (e.g., an upper page of data and a lower page of data, with each cell in a physical page storing one or more bits towards an upper page of data and one or more bits towards a lower page of data).

As shown in FIG. 2, a row 258 of memory cells can comprise a number of physical sectors 260-1, 260-2, . . . , 260-S (e.g., subsets of memory cells). Each physical sector 260 of cells can store a number of logical sectors of data. Additionally, each logical sector of data can correspond to a portion of a particular page of data. As an example, one logical sector of data stored in a particular physical sector can correspond to a logical sector corresponding to one page of data, and the other logical sector of data stored in the particular physical sector can correspond to the other page of data. Each physical sector 260, can store system data, user data, and/or overhead data, such as error correction code (ECC) data, LBA data, and metadata.

Figure 3:
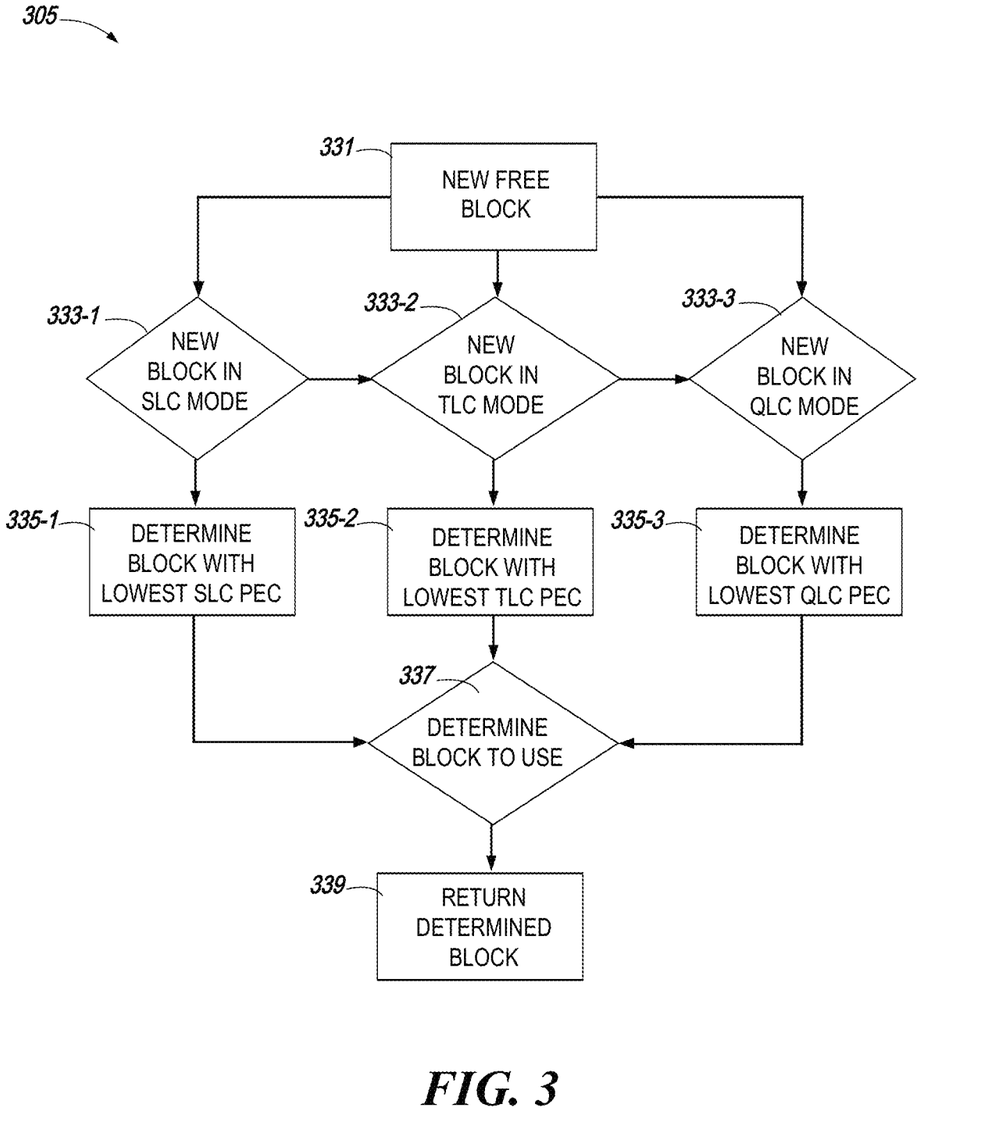
FIG. 3 illustrates an example flow diagram associated with monitoring mixed mode blocks in accordance with some embodiments of the present disclosure.

FIG. 3 illustrates an example flow diagram 305 associated with monitoring mixed mode blocks in accordance with some embodiments of the present disclosure. At operation 331, a memory sub-system can determine that a new free block should be selected in order to store received host data. The new free block can be a block that does not store data that needs to be saved. For example, the free block has not been written to, the data of the free block is no longer valid, or the data of the free block is no longer needed by the memory sub-system and can be reallocated for writing additional data to.

At operations 333-1, 333-2, or 333-3, a block PEC component (such as block PEC component 113 or 213 in FIG. 1 or 2, respectively) can determine whether the host data should be written in an SLC mode block (333-1), a TLC mode block (333-2), or a QLC mode block 333-3). As an example, a determination of which type of block to write the host data to can be based on the host data itself. Further, the determination of which type of block to write the host data to can be based on the current PEC counts of each type of block in the memory sub-system.

At operation 335-1, in response to determining that the new free block should be an SLC mode block, the PEC component can determine which SLC block of the pool of SLC blocks has the lowest SLC PEC value. At operation 335-2, in response to determining that the new free block should be an TLC mode block, the PEC component can determine which TLC block of the pool of TLC blocks has the lowest TLC PEC value. At operation 335-3, in response to determining that the new free block should be an QLC mode block, the PEC component can determine which QLC block of the pool of QLC blocks has the lowest QLC PEC value.

At operation 337, the PEC component can determine which free block to select from the pool of free blocks. In one embodiment, the PEC component can select the free block with the lowest PEC value for that particular type of block. For example, in response to an SLC block being needed, selecting the free SLC block with the lowest PEC value. At operation 339, the determined block selected for writing the host data to can be returned by the PEC component for writing the host data to. The host data can be written to the determined block.

Figure 4:
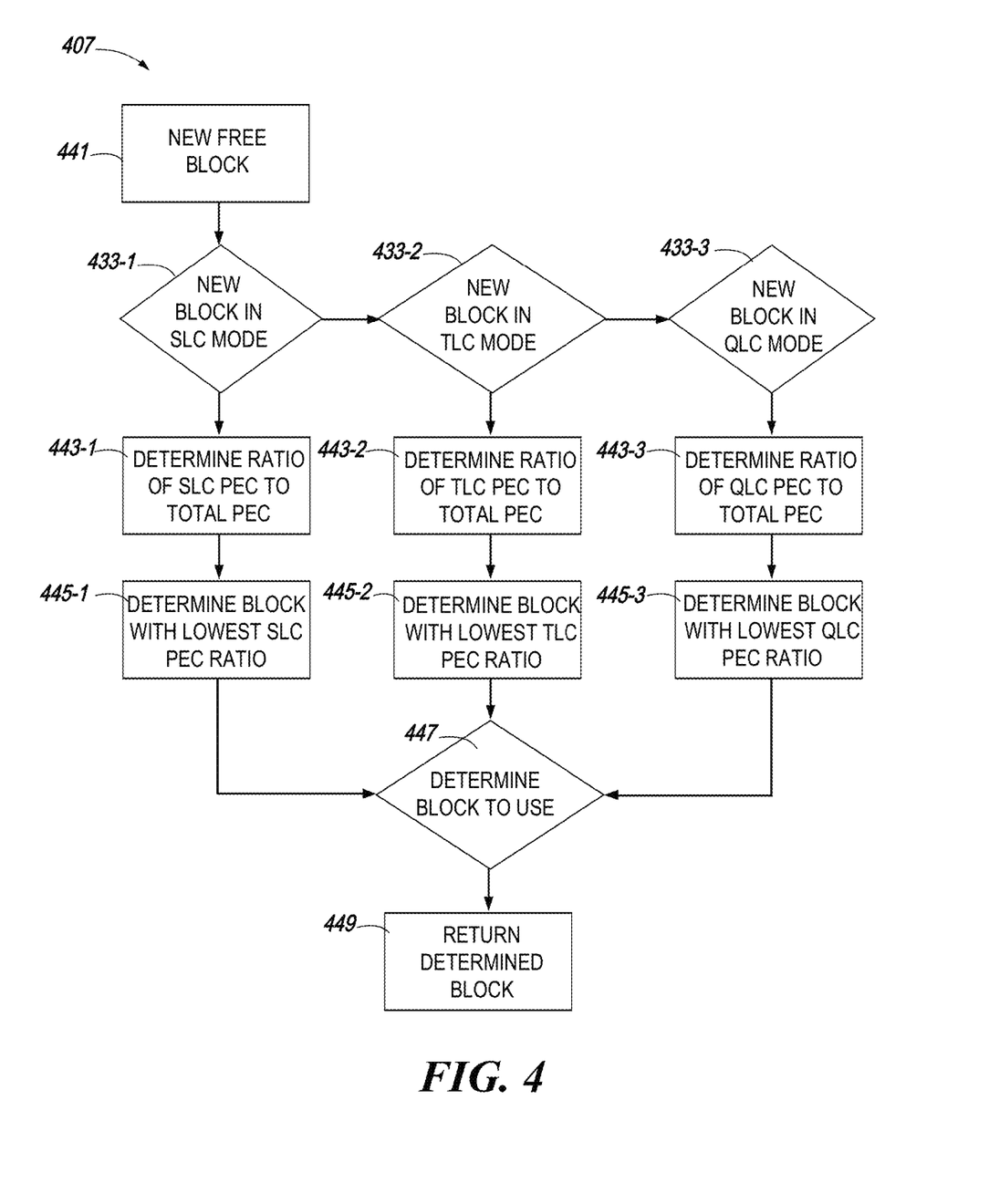
FIG. 4 illustrates an example flow diagram associated with monitoring mixed mode blocks in accordance with some embodiments of the present disclosure.

FIG. 4 illustrates an example flow diagram 407 associated with monitoring mixed mode blocks in accordance with some embodiments of the present disclosure. At operation 441, a memory sub-system can determine that a new free block should be selected in order to store received host data. The new free block can be a block that does not store data that needs to be saved. For example, the free block has not been written to, the data of the free block is no longer valid, or the data of the free block is no longer needed by the memory sub-system and can be reallocated for writing additional data to.

At operations 433-1, 433-2, or 433-3, a block PEC component (such as block PEC component 113 or 213 in FIG. 1 or 2, respectively) can determine whether the host data should be written in an SLC mode block (433-1), a TLC mode block (433-2), or a QLC mode block 433-3). As an example, a determination of which type of block to write the host data to can be based on the host data itself. Further, the determination of which type of block to write the host data to can be based on the current PEC counts of each type of block in the memory sub-system.

At operation 443-1, in response to determining that the new free block should be an SLC mode block, the PEC component can determine a ratio of an SLC PEC to a total PEC. For example, an SLC PEC of a particular block can be compared to a total PEC of a free block pool (SLC PEC+TLC PEC+QLC PEC). The total PEC can be a summation of all PECs for each of the types of blocks and the ratio can be the SLC PEC of the particular block over the total PEC (SLC PEC/(SLC PEC+TLC PEC+QLC PEC)). At operation 445-1, the PEC component can determine which SLC block of the pool of SLC blocks has the lowest SLC PEC ratio.

At operation 443-2, in response to determining that the new free block should be a TLC mode block, the PEC component can determine a ratio of an TLC PEC to a total PEC. For example, a TLC PEC of a particular block can be compared to a total PEC of a free block pool (SLC PEC+TLC PEC+QLC PEC). The total PEC can be a summation of all PECs for each of the types of blocks and the ratio can be the TLC PEC of the particular block over the total PEC (TLC PEC/(SLC PEC+TLC PEC+QLC PEC)). At operation 445-2, the PEC component can determine which SLC block of the pool of TLC blocks has the lowest TLC PEC ratio.

At operation 443-3, in response to determining that the new free block should be a QLC mode block, the PEC component can determine a ratio of an QLC PEC to a total PEC. For example, a QLC PEC of a particular block can be compared to a total PEC of a free block pool (SLC PEC+TLC PEC+QLC PEC). The total PEC can be a summation of all PECs for each of the types of blocks and the ratio can be the QLC PEC of the particular block over the total PEC (QLC PEC/(SLC PEC+TLC PEC+QLC PEC)). At operation 445-3, the PEC component can determine which QLC block of the pool of QLC blocks has the lowest QLC PEC ratio.

At operation 447, the PEC component can determine which free block to select from the pool of free blocks. In one embodiment, the PEC component can select the free block with the lowest PEC ratio for that particular type of block. For example, in response to an SLC block being needed, selecting the free SLC block with the lowest PEC ratio. At operation 449, the determined block selected for writing the host data to can be returned by the PEC component for writing the host data to. The host data can be written to the determined block.

Figure 5:
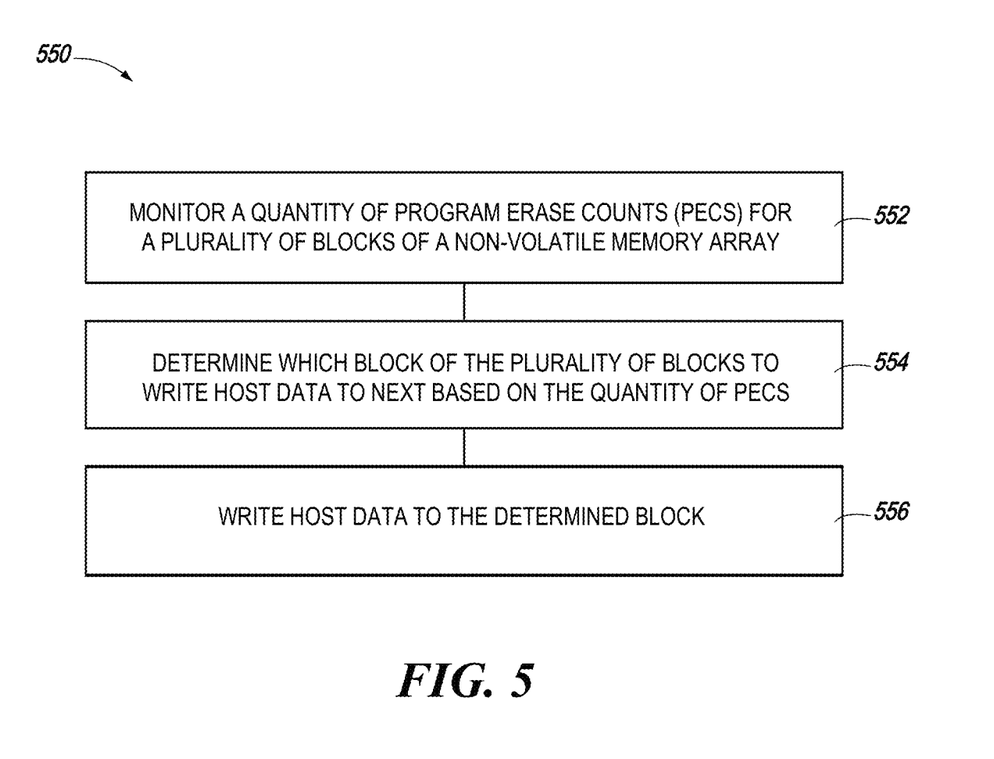
FIG. 5 illustrates an example method for monitoring mixed mode blocks in accordance with embodiments of the present disclosure.

FIG. 5 is a flow diagram corresponding to a method 550 for performing memory sub-system operations for monitoring mixed mode blocks in accordance with some embodiments of the present disclosure. The media management superblock component can be analogous to the media management threshold component in FIG. 1. The method 550 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 550 is performed by the block PEC component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 552, a quantity of program erase counts (PECs) for a plurality of blocks of a non-volatile memory array can be monitored. The method can further include incrementing the quantity of PECs associated with a type of block that the host data is written to by a PEC value of one. The plurality of blocks can include a portion of single-level cell (SLC) blocks, a portion of tri-level cell (TLC) blocks, and a portion of quad-level cell (QLC) blocks. The method can further include determining which type of block to write the host data to. The method can further include, based on the determination of which type of block to write the host data to, determining which block of the determined type of block has a lowest PEC for the portion of blocks of the determined type of block. The method 550 can further include determining a lowest PEC ratio by determining a ratio of PEC counts of a particular type of block to a summation of a quantity of PECs for the portions of SLC blocks, TLC blocks, and QLC blocks. The portions of SLC blocks, TLC blocks, and QLC blocks can make up a pool of free blocks in the non-volatile memory array.

At operation 554, which block of the plurality of blocks to write host data to next can be determined based on the quantity of PECs. For example, the quantity of PECs can be used to determine a block of a particular block type that has a lowest PEC for that particular block type. At operation 556, host data can be written to the determined block. Writing the host data can include writing the host data to the block with the lowest PEC. Subsequent host data can also be written to the determined block until the determined block has reached its data capacity to be written to or until a different type of block is determined to be written to from the host.

Figure 6:
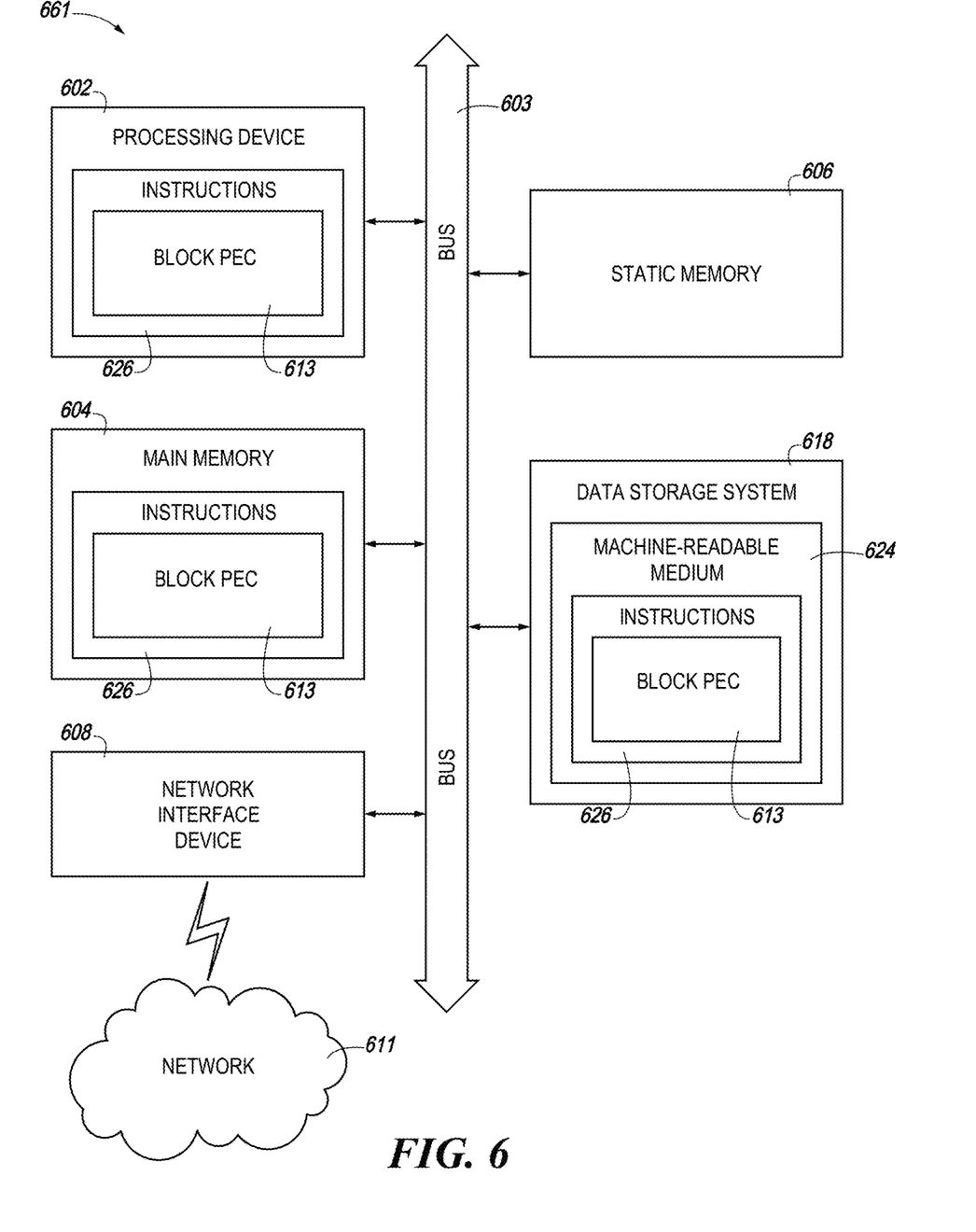
FIG. 6 is a block diagram of an example computer system in which embodiments of the present disclosure may operate.

FIG. 6 is a block diagram of an example computer system 661 in which embodiments of the present disclosure may operate. For example, FIG. 6 illustrates an example machine of a computer system 661 within which a set of instructions, for causing the machine to perform any one or more of the methodologies discussed herein, can be executed. In some embodiments, the computer system 661 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the block PEC component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 661 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 603.

The processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 661 can further include a network interface device 608 to communicate over the network 611.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 661, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a media management superblock component (e.g., the block PEC component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including solid state drives (SSDs), hard disk drives (HDDs), floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus, comprising:
a memory device; and
a controller coupled to the memory device and configured to:
for each free block of a plurality of free blocks, maintain:
a first program erase count (PEC) corresponding to a first type of block;
a second PEC corresponding to a second type of block; and
a third PEC corresponding to a third type of block;
responsive to determining a particular type of block to which host data is to be written, determine a particular free block among the plurality of free blocks that has a lowest PEC ratio corresponding to the particular type of block; and
wherein the particular free block among the plurality of free blocks that has the lowest PEC ratio is determined by, for the particular free block, dividing the PEC corresponding to the particular type of block by a sum of PECs corresponding to the first type of block, the second type of block, and the third type of block.

2. The apparatus of claim 1, wherein the first type of block is a single-level cell (SLC) block, the second type of block is a tri-level cell (TLC) block, and the third type of block is a quad-level cell (QLC) block.

3. The apparatus of claim 1, wherein the controller is configured to write the host data to the particular free block.

4. The apparatus of claim 3, wherein the controller is configured to, responsive to writing the host data to the particular free block, increment the PEC corresponding to the particular type of block for the particular free block.

5. The apparatus of claim 4, wherein the controller is configured to, responsive to writing the host data to the particular free block, increment the PEC corresponding to the particular type of block for the particular free block by one.

6. The apparatus of claim 1, wherein the plurality of free blocks are within a NAND memory array.

7. The apparatus of claim 1, wherein the apparatus comprises a mobile computing device.

8. A method, comprising:
for each free block of a plurality of free blocks of a memory device, maintaining:
a first program erase count (PEC) corresponding to a first type of block;
a second PEC corresponding to a second type of block; and
a third PEC corresponding to a third type of block;
responsive to determining a particular type of block to which host data is to be written, determining a particular free block among the plurality of free blocks that has a lowest PEC ratio corresponding to the particular type of block; and wherein the particular free block among the plurality of free blocks that has the lowest PEC ratio is determined by, for the particular free block, dividing the PEC corresponding to the particular type of block by a sum of PECs corresponding to the first type of block, the second type of block, and the third type of block.

9. The method of claim 8, further comprising writing the host data to the particular free block determined to have the lowest PEC ratio corresponding to the particular type of block.

10. The method of claim 9, wherein the method includes, subsequent to writing the host data to the particular free block:
    receiving a host write command;
    determining that data corresponding to the host write command is to be written to a block of the first type;
    for a particular free block, determining a PEC ratio corresponding to the first type of block;
    determining whether the determined PEC ratio corresponding to the first type of block is a lowest PEC ratio corresponding to the first type of block among all of the plurality of free blocks; and
    responsive to determining that the determined PEC ratio is the lowest PEC ratio corresponding to the first type of block among all of the plurality of free blocks, writing the data corresponding to the host command to the particular free block.

11. The method of claim 8, wherein the first type, second type, and third type of block correspond to different respective quantities of bits stored per memory cell.

12. The method of claim 8, wherein the first type of block is a single level cell (SLC) block.

13. The method of claim 12, wherein the second type of block is a tri-level cell (TLC) block.

14. The method of claim 13, wherein the third type of block is a quad-level cell (QLC) block.

15. An apparatus, comprising:
    a memory device comprising blocks of memory cells; and
    a processing device coupled to the memory device and configured to:
        for each free block of a plurality of free blocks, maintain:
            a first program erase count (PEC) corresponding to a first type of block; and
            a second PEC corresponding to a second type of block;
        responsive to determining a particular type of block to which host data is to be written, determine a particular free block among the plurality of free blocks that has a lowest PEC ratio corresponding to the particular type of block; and
        wherein the particular free block among the plurality of free blocks that has the lowest PEC ratio is determined by, for the particular free block, dividing the PEC corresponding to the particular type of block by a sum of PECs corresponding to the first type of block and the second type of block.

16. The apparatus of claim 15, wherein the first type of block is a single-level cell (SLC) block, and the second type of block is a tri-level cell (TLC) block.

17. The apparatus of claim 15, wherein the first type of block is a single-level cell (SLC) block, and the second type of block is a quad-level cell (QLC) block.

18. The apparatus of claim 15, wherein the apparatus comprises a solid state drive (SSD).

19. The apparatus of claim 18, wherein the SSD includes a system controller comprising the processing device.

20. The apparatus of claim 15, wherein the plurality of free blocks are mixed mode blocks.

* * * * *